(12) United States Patent
Talghader et al.

(10) Patent No.: US 8,629,398 B2
(45) Date of Patent: Jan. 14, 2014

(54) DETECTION BEYOND THE STANDARD RADIATION NOISE LIMIT USING SPECTRALLY SELECTIVE ABSORPTION

(75) Inventors: Joseph J. Talghader, Edina, MN (US); Ryan P. Shea, St. Paul, MN (US); Anand S. Gawarikar, Minneapolis, MN (US)

(73) Assignee: The Regents of the University of Minnesota, St. Paul, MN (US)

( * ) Notice: Subject to any disclaimer, the term of this patent is extended or adjusted under 35 U.S.C. 154(b) by 129 days.

(21) Appl. No.: 12/996,704

(22) PCT Filed: May 29, 2009

(86) PCT No.: PCT/US2009/003273
§ 371 (c)(1),
(2), (4) Date: Jun. 16, 2011

(87) PCT Pub. No.: WO2010/033142
PCT Pub. Date: Mar. 25, 2010

(65) Prior Publication Data
US 2011/0240860 A1    Oct. 6, 2011

Related U.S. Application Data

(60) Provisional application No. 61/130,353, filed on May 30, 2008.

(51) Int. Cl.
*G01J 5/20* (2006.01)
*G01J 5/02* (2006.01)

(52) U.S. Cl.
USPC .................................... 250/338.4; 250/340

(58) Field of Classification Search
USPC ......... 250/338.1, 338.4, 339.04, 339.07, 340, 250/332
See application file for complete search history.

(56) References Cited

U.S. PATENT DOCUMENTS

| | | | |
|---|---|---|---|
| 5,021,663 A | 6/1991 | Hornbeck |
| 5,142,414 A | 8/1992 | Koehler |
| 5,286,976 A | 2/1994 | Cole |
| 5,367,167 A | 11/1994 | Keenan |

(Continued)

FOREIGN PATENT DOCUMENTS

| | | |
|---|---|---|
| DE | 43 34 578 | 4/1995 |
| EP | 0 608 049 | 7/1994 |

(Continued)

OTHER PUBLICATIONS

Y. Wang et al, "Step-Wise Tunable Microbolometer Long-Wavelength Infrared Filter", The 13th International Conference on Solid-State Sensors, Actuators and Microsystems, Jun. 2005, p. 1006.*

(Continued)

*Primary Examiner* — David Porta
*Assistant Examiner* — Faye Boosalis
(74) *Attorney, Agent, or Firm* — Kagan Binder, PLLC

(57) ABSTRACT

High sensitivity thermal detectors that perform beyond the blackbody radiation noise limit are described. Thermal detectors, as described herein, use spectrally selective materials that absorb strongly in the wavelength region of the desired signal but only weakly or not at all in the primary thermal emission band. Exemplary devices that can be made in accordance with the present invention include microbolometers containing semiconductors that absorb in the MWIR and/or THz range but not the LWIR.

22 Claims, 11 Drawing Sheets

(56) References Cited

U.S. PATENT DOCUMENTS

| | | | |
|---|---|---|---|
| 5,550,373 | A | 8/1996 | Cole et al. |
| 5,589,689 | A | 12/1996 | Koskinen |
| 5,629,521 | A | 5/1997 | Lee et al. |
| 5,688,699 | A | 11/1997 | Cunningham et al. |
| 6,097,031 | A | 8/2000 | Cole |
| 6,133,572 | A | 10/2000 | Cunningham |
| 6,222,454 | B1 | 4/2001 | Harling et al. |
| 6,262,417 | B1 | 7/2001 | Ju |
| 6,303,934 | B1 | 10/2001 | Daly et al. |
| 6,307,194 | B1 | 10/2001 | Fitzgibbons et al. |
| 6,339,493 | B1 | 1/2002 | Scalora et al. |
| 6,518,597 | B1 | 2/2003 | Kim |
| 6,534,977 | B1 | 3/2003 | Duncan et al. |
| 6,573,504 | B2 | 6/2003 | Iida et al. |
| 6,608,711 | B2 | 8/2003 | Flanders et al. |
| 6,618,199 | B2 | 9/2003 | Cook |
| 6,667,479 | B2 | 12/2003 | Ray |
| 6,791,736 | B2 | 9/2004 | Jain |
| 6,806,470 | B2 | 10/2004 | Iida et al. |
| 6,816,636 | B2 | 11/2004 | Cole et al. |
| 6,900,440 | B2 | 5/2005 | Reed et al. |
| 7,002,697 | B2 | 2/2006 | Domash et al. |
| 7,015,457 | B2 | 3/2006 | Cole et al. |
| 7,095,026 | B2 | 8/2006 | Devitt et al. |
| 7,145,143 | B2 | 12/2006 | Wood et al. |
| 7,196,790 | B2 | 3/2007 | Cole |
| 7,262,413 | B2 | 8/2007 | Kauffman et al. |
| 7,460,246 | B2 | 12/2008 | Kothari |
| 7,800,066 | B2 | 9/2010 | Talghader |
| 7,968,846 | B2 | 6/2011 | Talghader et al. |
| 8,227,755 | B2 * | 7/2012 | Fagan et al. ............. 250/338.4 |
| 8,283,633 | B2 * | 10/2012 | Myrick et al. ............. 250/338.1 |
| 2002/0040967 | A1 | 4/2002 | Oda |
| 2003/0072009 | A1 | 4/2003 | Domash et al. |
| 2004/0089807 | A1 | 5/2004 | Wada et al. |
| 2004/0200962 | A1 | 10/2004 | Ishikawa et al. |
| 2004/0202399 | A1 | 10/2004 | Kochergin et al. |
| 2004/0217264 | A1 | 11/2004 | Wood et al. |
| 2004/0218509 | A1 | 11/2004 | Flanders et al. |
| 2005/0017177 | A1 | 1/2005 | Tai et al. |
| 2005/0226281 | A1 | 10/2005 | Faraone et al. |
| 2006/0039009 | A1 | 2/2006 | Kiesel et al. |
| 2006/0077528 | A1 | 4/2006 | Floyd |
| 2006/0091284 | A1 | 5/2006 | Viens et al. |
| 2007/0215808 | A1 | 9/2007 | Sekiguchi et al. |
| 2008/0035846 | A1 | 2/2008 | Talghader et al. |
| 2009/0140144 | A1 | 6/2009 | Myrick et al. |

FOREIGN PATENT DOCUMENTS

| | | |
|---|---|---|
| GB | 2 231 713 | 11/1990 |
| JP | 2005156255 | 6/2005 |
| WO | WO 96/21140 | 7/1996 |
| WO | WO 01/81879 | 11/2001 |
| WO | WO 2004/015783 | 2/2004 |
| WO | WO 2005/003704 | 1/2005 |
| WO | WO 2005/022900 | 3/2005 |

OTHER PUBLICATIONS

Aratani et al., "Micro Electro Mechanical Systems, An Investigation of Micro Structures, Sensors, Actuators, Machines and Systems," Sponsored by the IEEE Robotics and Automation Society in cooperation with the ASME Dynamic Systems and Control Division, "Process and Design Considerations for Surface Micromachined Beams for a Tuneable Interferometer Array in Silicon," 1993, pp. 230-235.

IBM Technical Disclosure Bulletin, vol. 32, No. 8A, Jan. 1990, 4 pages.

Aratani et al., "Surface Micromachined Tuneable Interferometer Array," Sensors and Actuators A, 43 (1994) pp. 17-23.

Neikirk et al., "Design of Infrared Wavelength-Selective Microbolometers Using Planar Multimode Detectors," Microelectronics Research Center, The University of Texas at Austin, SPIE's Microtechnologies for the New Millennium, May 15-18, 2003, pp. 1-16.

Li et al., "Thermal simulation of micromachines bridge and self-heating for uncooled $VO_2$ infrared microbolometer," Sensors and Actuators ! 126 (2006) pp. 430-435.

Theocharous et al., "Detectors for Mid- and Far-infrared Spectrometry: Selection and Use," Instrumentation for Mid- and Far-infrared Spectroscopy, John Wiley & Sons Ltd., (2002), pp. 349-367.

Wang et al., "Step-Wise Tunable Microbolometer Long-Wavelength Infrared Filter," Electrical and Computer Engineering, University of Minnesota, 4 pages, Jun. 5, 2005.

A.S. Welling et al., "Antenna-coupled microbolometers for multi-spectral infrared imaging," Proceedings of the SPIE, vol. 6206, pp. 62061F-1 to 62061F-8, 2006.

S. Han et al., "Multilayer fabry-perot microbolometers for infrared wavelength selective detectors," Proceedings of the SPIE, vol. 6206, pp. 62061G-1 to 62061G-7, 2006.

V.N. Leonov et al., "Two-color thermal detector with thermal chopping for infrared focal plane arrays," Applied Optics, vol. 40, No. 16, 2001.

M. Almasri et al., "Amorphous silicon two-color microbolometer for uncooled IR detection," IEEE Sensors Journal, vol. 6, No. 2, pp. 293-300, 2006.

\* cited by examiner

DETECTION BEYOND THE STANDARD RADIATION NOISE LIMIT USING SPECTRALLY SELECTIVE ABSORPTION

CROSS-REFERENCE TO RELATED APPLICATION

The present application claims priority to U.S. Provisional Patent Application having Ser. No. 61/130,353, filed on May 30, 2008, entitled DETECTION BEYOND THE STANDARD RADIATION NOISE LIMIT USING SPECTRALLY SELECTIVE ABSORPTION, the entire contents of which are incorporated herein by reference for all purposes.

GOVERNMENT RIGHTS

This invention was made with Government support under Grant No. DAAD19-03-1-3043, awarded by the Army Research Office.

TECHNICAL FIELD

The present invention is directed to infrared detectors and related methods. In particular, the present invention is directed to high sensitivity thermal detectors having spectrally selective absorption to achieve detectivity beyond the blackbody limit.

BACKGROUND

Thermal detectors include a sensor that absorbs light energy and then transduces the resulting heat into a useful electrical signal related to the amount or type of light absorbed. Perhaps the most prominent current thermal detectors include microbolometers, which absorb light across a broad band of the infrared, usually the mid-wave infrared (MWIR, corresponding to wavelengths of roughly 3 microns to 5 microns) or long wave infrared (LWIR, roughly 8 microns to 14 microns) and then convert heat into a change in resistance. These devices are very popular in commercial uncooled imaging cameras. Their basic structure includes a small micromachined sensor plate connected to an underlying substrate by thin support beams. The support beams have a low thermal conductance so that large increases in the temperature of the sensor plate occur with small amounts of absorbed light. The sensor plate includes a resistor made of a material with a high magnitude temperature coefficient of resistance (TCR). One common TCR material in use is vanadium oxide, originally developed for microbolometers in the 1980's. A pulsed or continuous bias current is applied to the resistor and the absorbed light energy can be measured through the voltage response. Some other common thermal detector technologies include thermoelectric detectors where the heat from light is converted into a voltage using the Seebeck effect, and pyroelectric detectors where heat from absorbed light induces a voltage signal via a change in the internal polarization of a ferroelectric material.

There are a variety of noise sources that can limit the performance of a thermal detector. For a biased single-pixel detector, the most important of these include Johnson noise, 1/f noise, and thermal noise. Thermal noise originates from the fluctuations in the quanta of energy transferred to and from the detector. These quanta can take the form of either phonons if solid-state conduction dominates the heat transfer or photons if radiation dominates. Traditionally, radiation heat transfer has been considered the fundamental noise limit because even if all of the other noise sources are reduced by technological innovations, the photon fluctuations still remain due to Planck's Law.

SUMMARY

The present invention provides high sensitivity thermal detectors that reduce their radiation noise to perform near or even beyond the blackbody radiation noise limit. Thermal detectors in accordance with the present invention use spectrally selective materials that absorb strongly in the wavelength region of the desired signal but only weakly or not at all in the primary thermal emission band. Preferably, the entire detecting device uses materials that have this property or take up such a small area or have such a low absorption that they do not significantly contribute to radiation noise. Exemplary devices that can be made in accordance with the present invention include microbolometers containing semiconductors that absorb in the MWIR but not the LWIR and/or dielectrics that absorb in the THz range but not the LWIR. The thermal radiation noise for these devices is determined by integrating the blackbody emission equation only over wavelengths shorter (or longer) than the LWIR; therefore, most radiation noise energy is eliminated. At elevated or reduced temperatures, the preferred absorption and transparency spectral bands will shift.

The present invention describes thermal detectors fabricated from materials whose primary absorption lies away from the thermal emission maximum. This enables the devices to have a lower radiation noise than the blackbody or broadband radiation limit of traditional thermal detectors. Preferably, all components of the detector are be designed toward this end, such as structural materials, temperature sensitive transducers, and absorption materials. Otherwise, while enhanced absorption in one particular region may be achieved, the radiation noise will not be extensively reduced. Cavity coupling may optionally be used to enhance the effects of this process. One possible application of the technology is in uncooled midwave infrared microbolometers using semiconductor materials such as HgCdTe, InSb, PbSe, or their alloys.

An exemplary device in accordance with the present invention comprises a broadband thermal detector for sensing MWIR infrared radiation having detectivity greater than $1.4 \times 10^{10}$ cmHz$^{1/2}$/W.

Thermal detectors in accordance with the present invention preferably include a low emissivity (absorption) sensor such as a microbolometer or thermoelectric sensor plate, for example. In an exemplary embodiment, the sensor does not necessarily need to be positioned within an optical cavity, although such placement can improve spectral performance in many cases. Such thermal detectors incorporate materials that absorb very little of the primary thermal emission band for the temperature of interest.

Thermal detectors in accordance with the present invention also preferably utilize ultra-low thermal conductance support structures and provide sub-radiation limit sensitivity in single pixels or arrays. In one embodiment, supports comprising a dielectric structural layer and conductor are preferably used. In the current state of the art, these supports can have thermal conductances on the order of a few times $10^{-9}$ W/K with resistances on the order of 100 k$\Omega$ or less. In general, when using the same materials, a higher thermal conductance leads to a lower electrical resistance. Some preferred support materials include low thermal conductivity dielectrics such as silicon dioxide and magnetic metal alloys such as nickel-iron (NiFe), for example. For detectors using continuous bias read-out or other read-outs with low Johnson and 1/f noise, low thermal conductivity support structures can be used to achieve sensitivity beyond the standard blackbody radiation limit. However, to obtain array-compatible small pixels at maximum sensitivity using pulse bias read-out, more advanced support structures such those using thermal switching and/or interface contacts may be used. Supports for thermoelectric detectors might use different materials for the conductors such as those having high Seebeck coefficients and high thermoelectric efficiencies. Other sensitive read-outs may use optical means, say by tracking the spectral position of the cavity optical resonance or the spatial position of the pattern diffracted, transmitted, refracted, or reflected from the sensor by a read-out optical probe. While optical techniques are more difficult with imaging arrays, such techniques have the advantage of reducing or eliminating electrical read-out noise.

Sensors in accordance with the present invention preferably comprise generally thin membranes, not only for emissivity reasons, but also for optimizing time constant. It is noted, however, that sensors in accordance with the present invention can have membranes of any desired functional thickness. In order to operate in the thermal radiation limit, the thermal conductance must be extremely low, which forces the time constant of the sensors to undesirably high values. To circumvent this, sensor membranes are preferably reduced in thickness to a few tens of nanometers or less. In this way, typical frame rate detection can still be achieved. It should be noted that having long time constants in some potential applications such as chemical sensing or astronomy is not necessarily detrimental, so the exact thickness desired will be a function of desired time constant, sensor area, and materials used.

Exemplary sensor materials comprise HgCdTe, PbSe, InSb and associated alloys, but also traditional materials such as $VO_x$ and $SiO_2$ so long as their area or thickness is compatible with drastically reduced radiation noise in the primary thermal IR emission band. HgCdTe, PbSe, and InSb are semiconductors with narrow bandgaps that absorb well at wavelengths shorter than the LWIR but absorb little in the LWIR. This would make them useful as primary absorbing materials for exemplary devices. Note that these materials need not be crystalline as they are in photon detectors. Because their primary function is only to absorb and create heat, a large amount of non-radiative recombination is actually useful to the detector. $VO_x$ is one of the industry standard TCR materials, and as a result has a well-characterized high-TCR response. Other alternative conductive materials may be used for the TCR layer, including silicon, germanium, and zinc sulfide. It is well known that semiconductors generally have high TCRs, so swapping out one for another in the TCR structure is possible, provided that their absorption properties are carefully assessed. The $SiO_2$ is used as an insulator and etch stop. $VO_x$ can be deposited to have minimal absorption in the LWIR, and $SiO_2$, with a strong absorption near 10 microns, can be deposited very thin to prevent electrical cross-talk between the semiconductor and TCR layers but still have minimal absorption in the LWIR. Other materials can be used to further minimize LWIR absorption or for other wavelengths or wavelength-tunable devices. For example, a thin metal could be used as a reflector in the device if one wished to enhance a particular spectral band. However use of metals must be done with care as they commonly have a more uniform spectral absorption across the LWIR or MWIR therefore may degrade the spectral selectivity of the primary semiconductor material. For the supports, materials having low thermal conductivity and conductive layers with a high ratio of electrical to thermal conductivity are preferred. Exemplary materials include silicon dioxide as the structural support material and sputtered NiFe as the conductor. Note that in some embodiments, it may be useful to use a material for more than one purpose, such as structural layers, TCR layers, and/or absorption layers.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

Figure 1A:
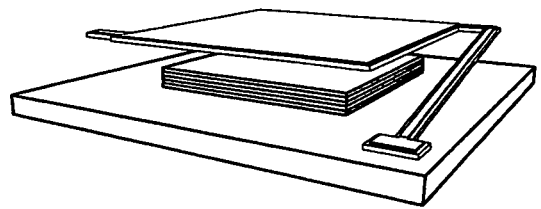
FIG. 1a is a schematic view of an exemplary microbolometer structure that uses selective absorption to achieve detectivity beyond the blackbody limit in accordance with the present invention. The device of FIG. 1a illustrates a substrate reflector.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The radiation noise limit is considered the ultimate limit for performance of thermal detectors [1,2]. The performance is typically embodied by the detectivity parameter, which for uncooled detectors is approximately $D^* \sim 1.4 \times 10^{10}$ cmHz$^{1/2}$/W. A value of $D^*=2.0\times10^{10}$ cmHz$^{1/2}$/W is often quoted in literature; this value is obtained by integrating the blackbody radiation spectrum over a hemisphere. In the case of our exemplary devices, the spectrum is integrated over a full sphere, because both sides of the device radiate and this calculation gives a more realistic description of what would happen to an actual uncooled device. In prior art, the thermal detectors that have been used to derive the radiation noise limit are assumed to absorb uniformly across all wavelength ranges. With the advent of multiband technology to distinguish targets by differences in their SWIR, MWIR, and LWIR images, there have been some thermal devices developed which are designed to preferentially absorb multiple broad bands [3,4,5,6,7,8]. Additional work [7,8,9,10,11,12] has shown that thermal detectors can distinguish extremely narrow spectral bands and be tunable across a wide range. An aspect of the present invention relates to the absorption properties of the bolometer materials rather than developing new TCR materials, so traditional TCR materials such as VOx can be used, but it is interesting to note that at least one midwave infrared semiconductor, PbSe, has been used as a TCR material itself (see U.S. Pat. No. 7,262,413). Because most semiconductors have significantly higher TCR coefficients than metals, it is contemplated that other midwave infrared semiconductors such as InSb and HgCdTe and their alloys will also have useful TCRs. In [10], Talghader describes exemplary devices that can exceed the blackbody radiation limit using a sensor positioned in and coupled with an optical cavity. The sensor interacts very little with the radiation background, reducing the radiation noise, but in the direction and resonance of the optical cavity it interacts with both signal and noise. The detectivity of these devices can be determined by the width of the spectral passband and the numerical aperture of the optical cavity. Although this concept works for a variety of bandwidths, it is most efficient for narrowbands that are within the primary emission band of the background thermal radiation. The strongest thermal emission spectral band is roughly 8-14 μm at room temperature, shifting to shorter or longer wavelengths at higher or lower temperatures, respectively.

If one does not wish to detect infrared light in spectral regions with strong thermal emission then one can get sensitivity beyond the blackbody radiation limit without the need for an optical cavity. However, an optical cavity can be used and can make the concept more efficient as described below. One can use spectrally selective materials that absorb strongly in the wavelength region of the desired signal but only weakly or not at all in the primary thermal emission band. Example devices that can be made in accordance with the present invention include microbolometers containing semiconductors that absorb in the MWIR or THz range but not the LWIR. The thermal radiation noise for these devices is determined by integrating the blackbody emission equation only over wavelengths shorter than the LWIR; therefore, most radiation noise energy is eliminated.

FIG. 1 illustrates a standard microbolometer except that the materials of the device have been designed to absorb in the MWIR (or other desired wavelength region) but not the LWIR (the strongest thermal emission band). For example, an exemplary device comprises three layers: an absorber of PbSe, a very thin TCR layer of VOx, and a structural (insulating) layer of ZnS. None of these materials has significant absorption in the LWIR, but PbSe is a semiconductor that has a bandgap energy absorbing in the MWIR. So this exemplary microbolometer does not interact significantly with the room temperature thermal emission but absorbs quite well in the MWIR. If the support structure of the device is designed for extreme thermal isolation so that the thermal conductance noise is below that of blackbody radiation, then ultrahigh sensitivity can be achieved.

The thickness of PbSe that must be deposited in order to get significant absorption is substantial, even neglecting surface reflections, which might be optimally reduced, for example, by using an antireflection (AR) coating or structuring a sub-wavelength (AR) grating into the pixel surface. This means that the thermal mass of the microbolometer is very high. When compounded by the ultra-extreme thermal isolation, this leads to a very high time constant. In order to make the device efficient, one of two routes may be taken: first, the pixel size may be made extremely small (<25 μm per pixel) as is typical in FPAs; second, one may choose to place a reflector beneath the device and/or alter the materials or thicknesses of the microbolometer layers to create a top mirror coupler. Some combination of these two may also be chosen. Among the cavities that would be suitable for this process are variants of those described in [9]. By including an optical cavity one can reduce the thickness of the PbSe to a tenth of a micron or less, which would make the time constant low enough for most sensing applications. This can be done to either maximize broadband absorption as with standard microbolometer reflectors or isolate the absorption to a specific spectral region. The introduction of a substrate reflector and microbolometer reflector layers can also allow one to choose a broadband absorber instead of a bandgap absorber and let the optical layer coating design do the spectral selection. This will not be as effective in eliminating LWIR interaction but will still reduce it substantially.

Figure 1B:
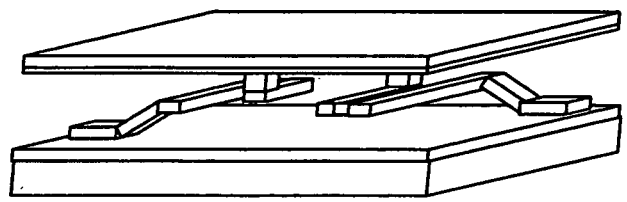
FIG. 1b is a schematic view of another exemplary microbolometer structure that uses selective absorption to achieve detectivity beyond the blackbody limit in accordance with the present invention. The device of FIG. 1b illustrates support structures tucked under the device.
Figure 2:
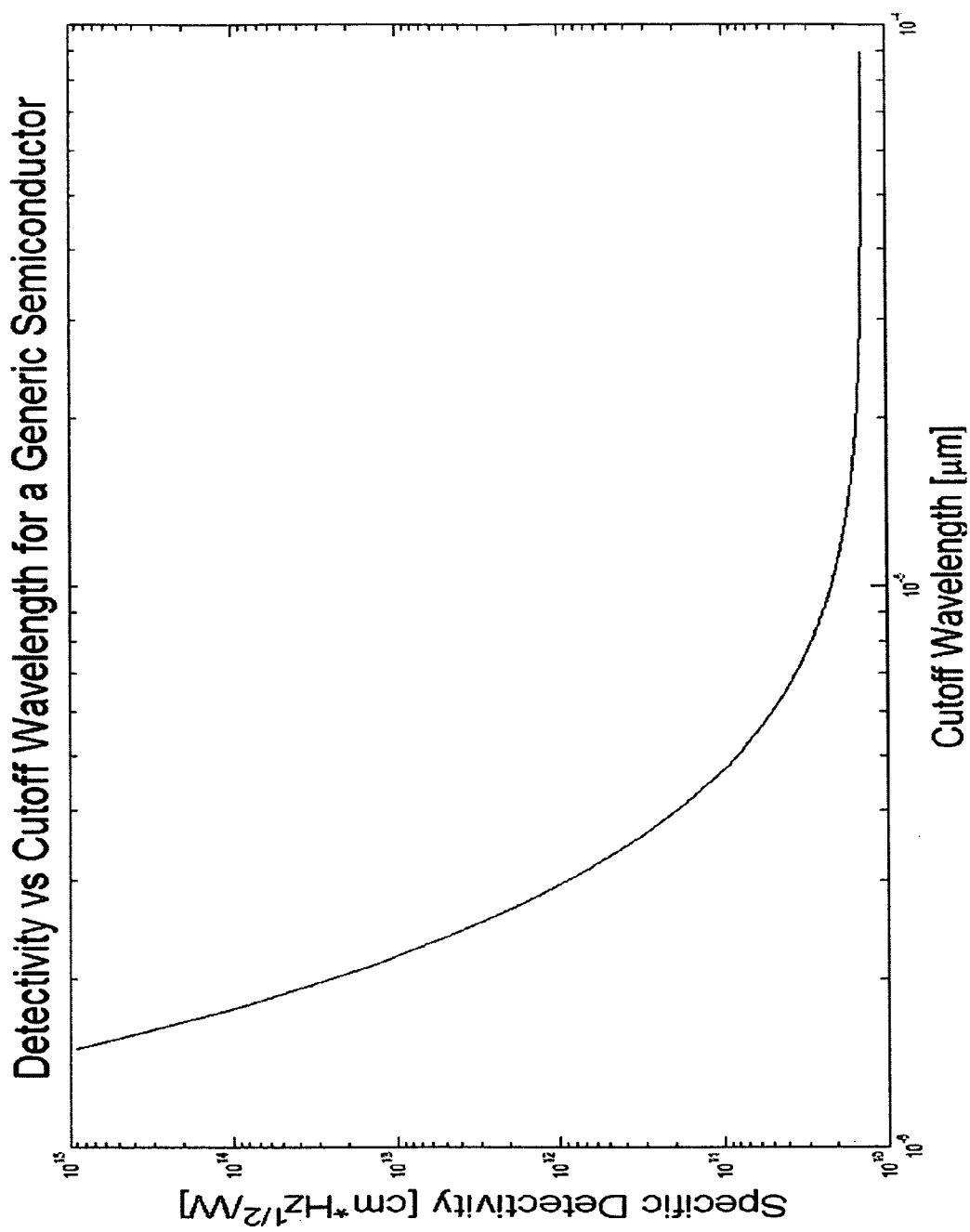
FIG. 2 is a diagram showing the relationship between detectivity and semiconductor bandgap wavelength for an ideal semiconductor that absorbs all incident light above its bandgap energy but none below it. This relationship assumes a structure like the exemplary structure of FIG. 1b to maximize pixel density in an array. A cavity coupled structure using a bolometer separated from its two mirrors could exceed the plotted detectivities substantially, but would more difficult to form into an array and would have a lower fill factor.

FIGS. 1 and 2 show the structure and detectivity of a microbolometer made with an ideal semiconductor that absorbs everything for photon energies above its bandgap, but minimally at energies below it. FIG. 1a shows a microbolometer with a substrate reflection to enhance coupling which might require supports splayed outward from the pixel plate. FIG. 1b shows a two level structure with legs bent underneath the bolometer to maximize fill factor.

Note that the microbolometer does not have to have a very narrow spectral resonance even if it is being used as a chemical sensor. If the device is broadband or has a broad resonance, an external filter such as a Fabry-Perot cavity can be used to further narrow the spectrum, such as for narrowband applications. The system can be made tunable through the narrowband filter, the integrated optical cavity, or both. Also, such designs (sans filter) could be used for broadband MWIR imaging focal plane arrays. Parameters such as time constant, pixel size, and noise issues are designed accordingly. Other spectral ranges could be considered as well such as SWIR or THz for objects at room or elevated temperature or LWIR for objects at elevated or reduced temperatures. In accordance with the present invention, the devices incorporate materials and/or cavities that absorb very little of the primary thermal emission band for the temperature in question.

Selective absorption can also be used in tandem with the low emissivity approach (described in U.S. patent application Ser. No. 11/999,739, to Talghader et al., filed on Dec. 6, 2007, the entire disclosure of which is incorporated by reference herein for all purposes) to obtaining high detectivity thermal detectors. When using low emissivity structures to obtain high performance, the sensitivity may vary depending on the chosen width of the spectral resonance. It is therefore harder to get extremely high performance using wider resonances, because the off-resonance spectral absorption and off-axis directional absorption will both be higher than for a narrow-band structure. The reason for this is that the absorption of the thermal detector sensor must be higher to couple well with a wide resonance optical cavity. With selective absorption, one can choose the material in the sensor so that the absorption is high in a desired wavelength range but lower outside it. For example, silicon dioxide has a high absorption peak in the LWIR around $\lambda\sim9.5$ μm and 10 μm but a much lower absorption outside this range. If a detector is desired with a spectral width of, say 0.3 μm, between 9.6 μm to 9.9 μm, then a low finesse cavity designed with a spectral resonance of 0.3 μm could be used with an appropriate thickness of silicon dioxide. Since the silicon dioxide has a very low absorption outside the signal spectral range, the sensor would interact very little with the radiation background, making the ultimate detectivity comparable to detectors with much narrower spectral resonances but absorption uniform with wavelength.

An exemplary technology area of these devices is directed to infrared detectors, where infrared is defined broadly to include THz radiation (e.g. $\lambda\sim0.7$ μm –1 mm, near IR to sub-mm).

An exemplary optical layer structure in accordance with the present invention that is sensitive to the MWIR comprises a sensor structure comprising thin layer of PbSe over a substrate reflector. If the detector comprises a microbolometer, the PbSe sensor structure preferably includes a thin insulator and TCR layer(s). The additional layers are chosen for minimal absorption outside the MWIR, (e.g. ZnS and VOx). An exemplary layer structure and example device characteristics are given in Table 1.

TABLE 1

Layer structure and device characteristics for an exemplary thermal detector in accordance with the present invention.

Layer Structure

| Material | Thickness |
|---|---|
| PbSe | 4.00E−08 |
| Air | 5.00E−07 |
| Ge | 2.50E−07 |
| ZnS | 4.46E−07 |
| Ge | 2.50E−07 |
| ZnS | 4.46E−07 |
| Ge | 2.50E−07 |
| ZnS | 4.46E−07 |
| Ge | 2.50E−07 |

Device Dimensions

| | |
|---|---|
| Plate Linear Dimension | 250 μm |
| Plate Thickness | 40 nm |
| Leg Length | 250 μm |
| Support Thickness | 40 nm |
| Support Width | 3 μm |
| Metal Line Thickness | 10 nm |
| Metal Line Width | 1 μm |
| Thermal Capacitance | 3.55E−09 |
| G (Legs) | 2.18E−09 |
| G (Radiation) | 6.26E−09 |
| Time Constant | 4.20E−01 |

Simulated sensitivity and absorption plots are provided in FIGS. 4-7.
Note that not all necessary electrical layers are included.

TABLE 2

Layer structure and device characteristics for an exemplary thermal detector accordance with the present invention.

Layer Structure

| Material | Thickness |
|---|---|
| Al$_2$O$_3$ | 5.00E−09 |
| PbSe | 4.50E−08 |
| Al$_2$O$_3$ | 5.00E−09 |
| Air | 5.00E−07 |
| Ge | 2.50E−07 |
| ZnS | 4.46E−07 |
| Ge | 2.50E−07 |
| ZnS | 4.46E−07 |
| Ge | 2.50E−07 |

Device Dimensions

| | |
|---|---|
| Plate Linear Dimension | 150 μm |
| Plate Thickness | 50 nm |
| Leg Length | 500 μm |
| Support Al$_2$O$_3$ Thickness | 5 nm |
| Support SiO2 Thickness | 40 nm |
| Support NiFe Thickness | 10 nm |
| Support Al$_2$O$_3$ Width | 3 μm |
| Support SiO2 Thickness | 2 μm |
| Support NiFe Width | 1 μm |
| Thermal Capacitance | 1.79E−9 J/W |
| G (Legs) | 2.63E−9 W/K |
| G (Radiation) | 5.33E−9 W/K |
| Time Constant | .225 s |

Simulated sensitivity and absorption plots are provid in FIGS. 4-7.
Note that not all necessary electrical layers are included.

Figure 3:
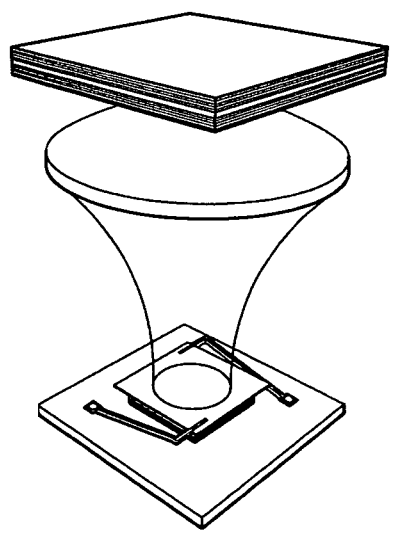
FIG. 3 is a schematic view of an exemplary MWIR pixel with spectrally narrowband external filter and a simple IR focusing lens. Note that the external filter merely shows one possible use in chemical sensing applications. Other applications may use arrays with no filters for imaging, for example. The simulations below describe the device structure itself and no filter is assumed.

One application of detectors in accordance with the present invention would be for narrowband chemical sensing. An exemplary detector is shown in FIG. 3, with an optional external filter. An alternative to the external filter would be to create a more spectrally selective detector structure such as described in [9]. The exemplary detector has been designed with a large plate area for high sensitivity, but slow time constant. Such a device can be useful as a single pixel optically aligned with a central cross-hair of a hand-held camera (e.g. cell phone) for passive stand-off chemical sensing.

Note that this exemplary structure has static spectral characteristics. Tunability at the detector level could be introduced with electrostatic or other actuation as described in [9]. The external filter can also be tuned in any number of known ways.

Other designs can be used in arrays for broad-band detection in a single-band MWIR focal plane array (FPA) or multi-band FPAs. As mentioned before, these structures could also be optimized for terahertz applications.

Figure 4:
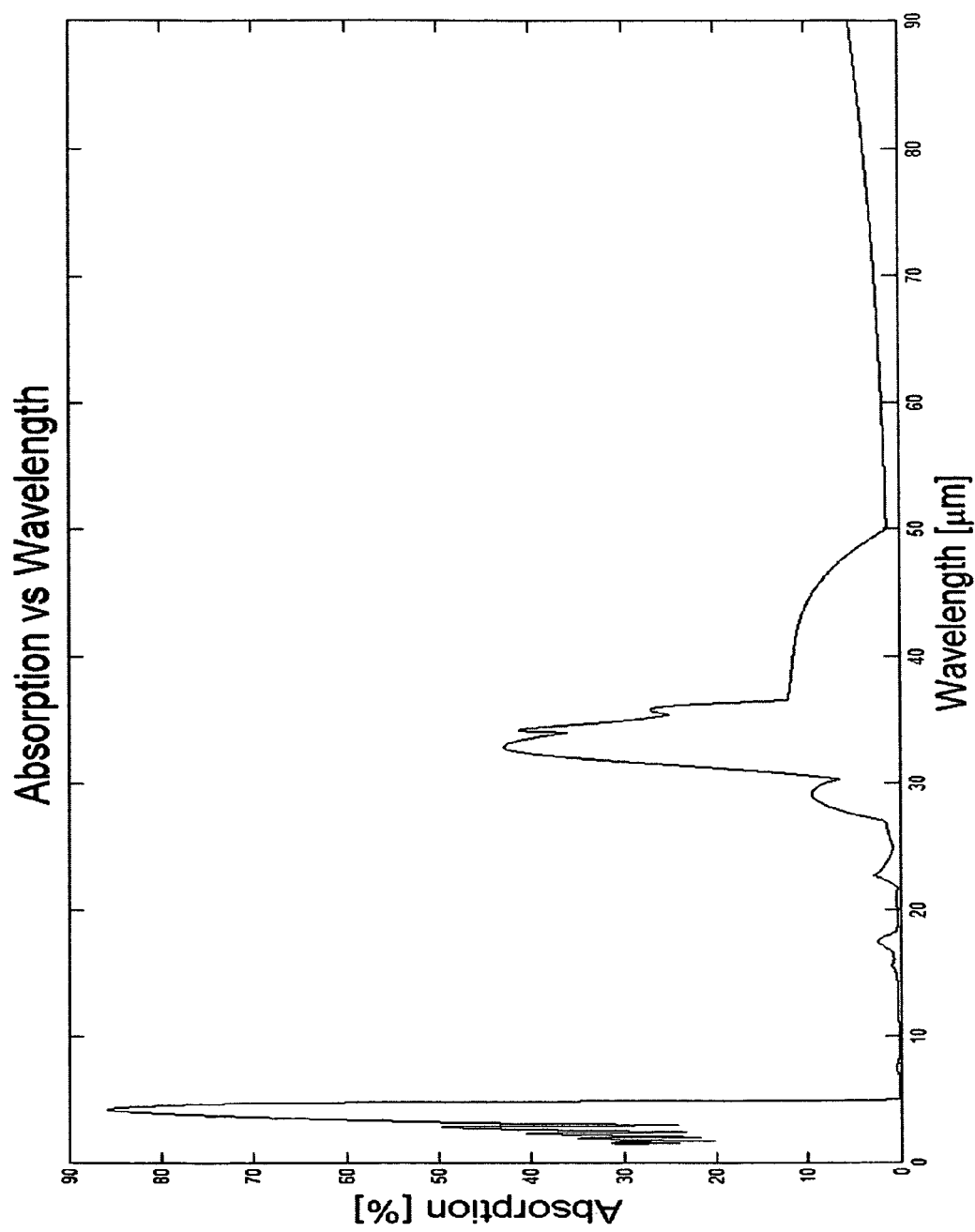
FIG. 4 is a plot of absorption versus wavelength for the exemplary structure of Table 1. The wavelength axis shows the wavelength ranges from UV to near-THz.
Figure 5:
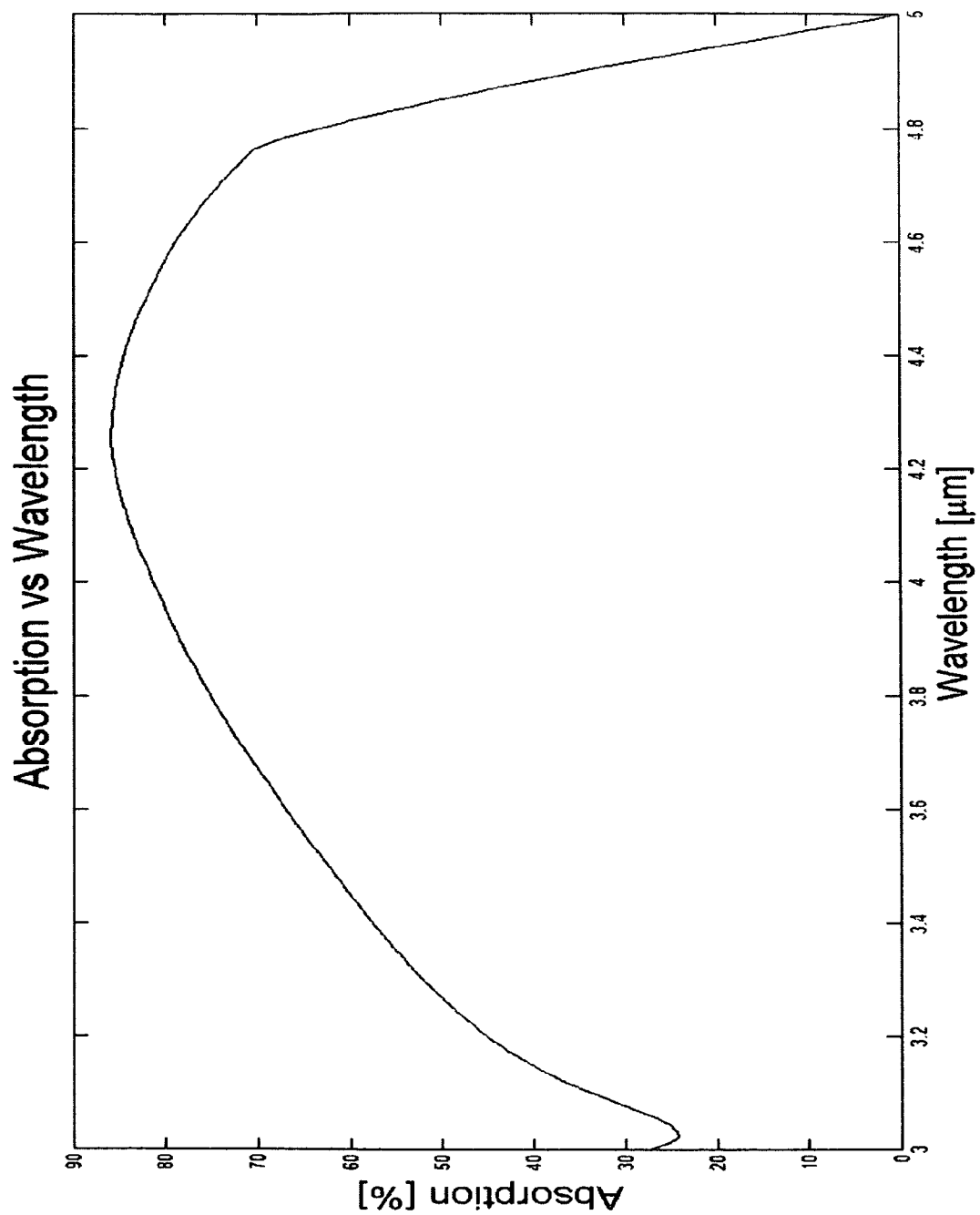
FIG. 5 is another plot of absorption versus wavelength for the exemplary structure of Table 1. The wavelength axis shows the MWIR only.
Figure 6A:
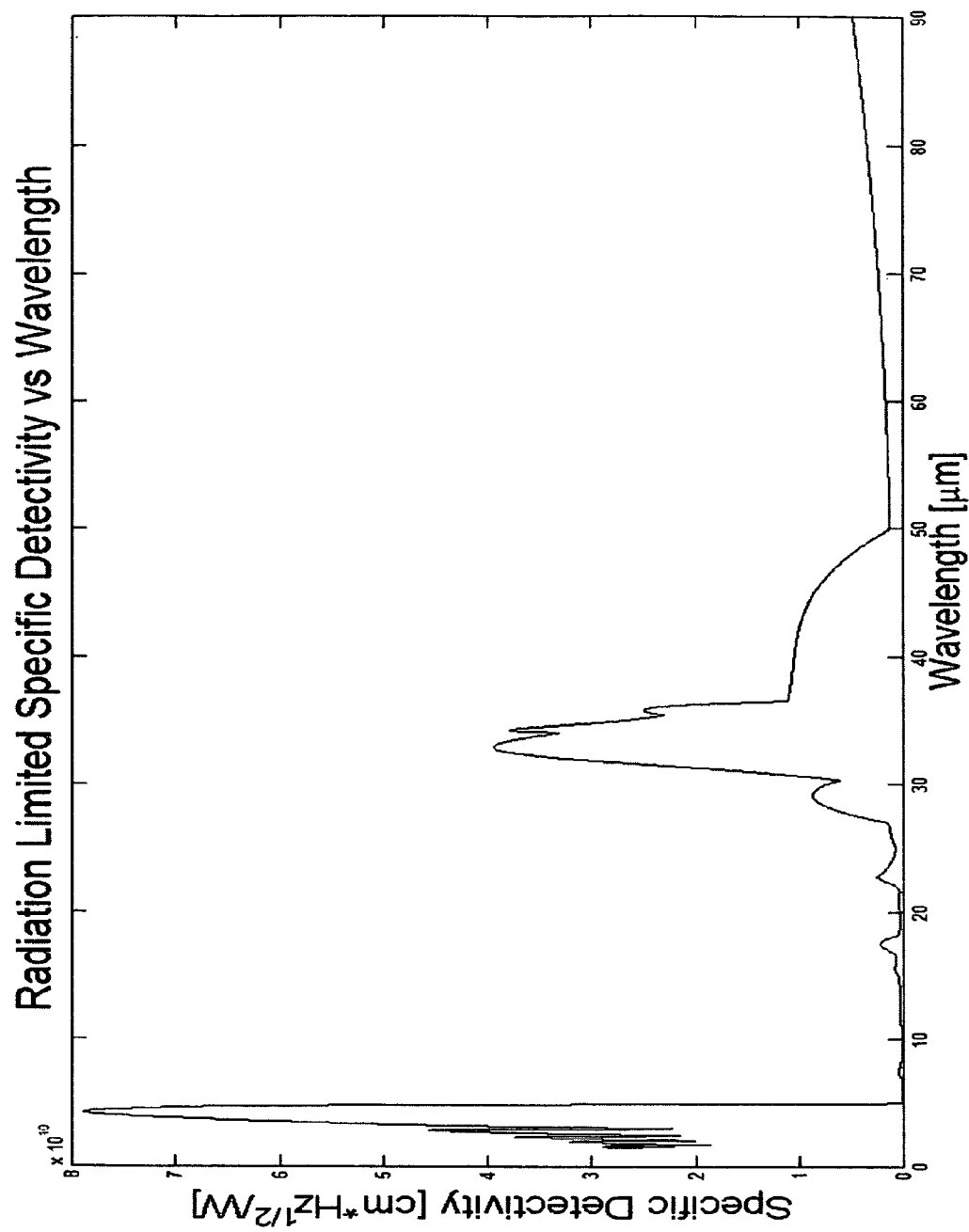
FIG. 6a is a plot of Detectivity versus wavelength at T=290K for the exemplary structures of Tables 1 and 2 with only radiation noise considered. Note that the blackbody radiation limit gives a maximum detectivity of approximately $1.4 \times 10^{10}$ cmHz$^{1/2}$/W and detectors in accordance with the present invention exceed it by over a factor of five.
Figure 6B:
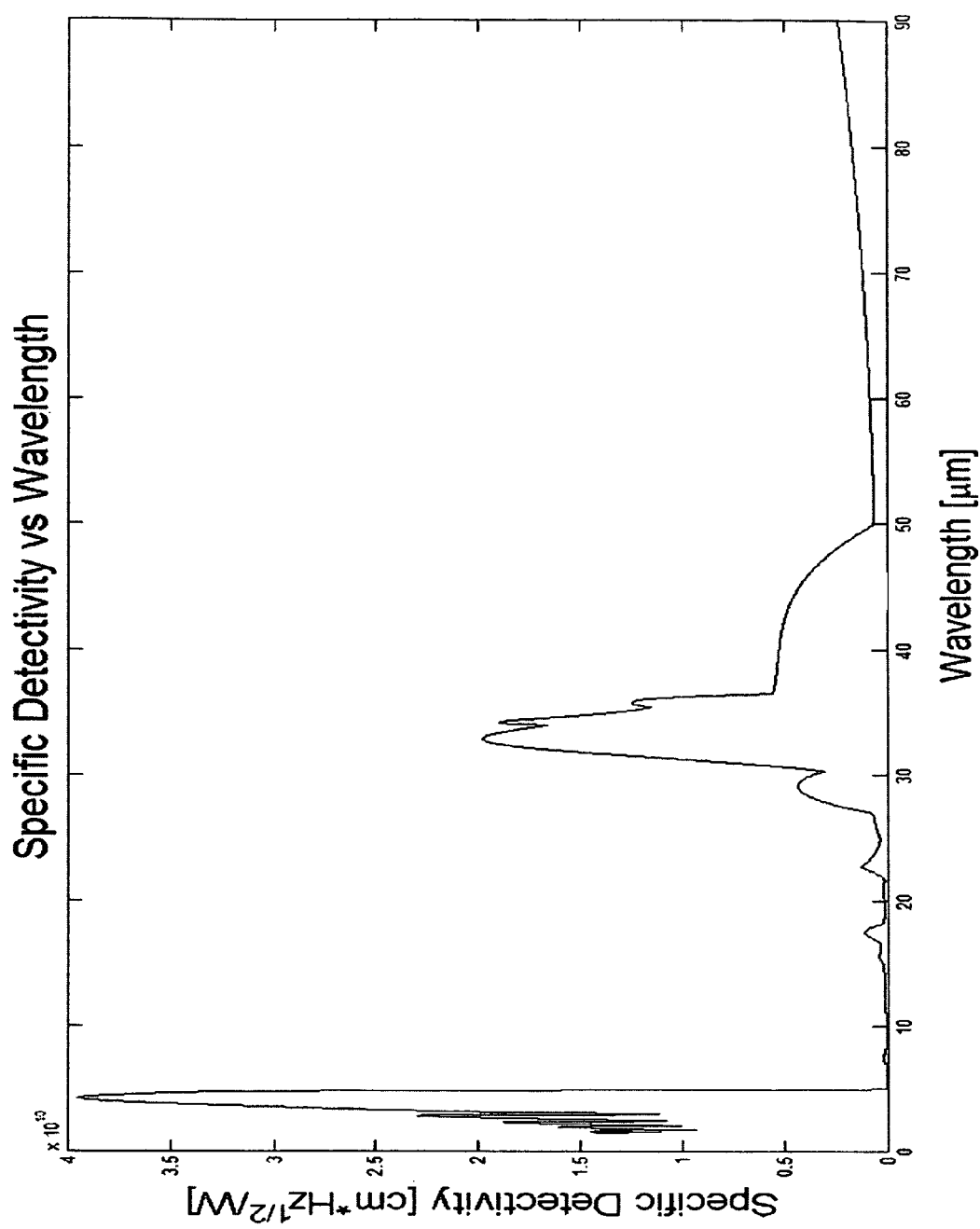
FIG. 6b is a plot of Detectivity versus wavelength at T=290K for the exemplary structure of Table 1 considering substantially all noise sources.
Figure 6C:
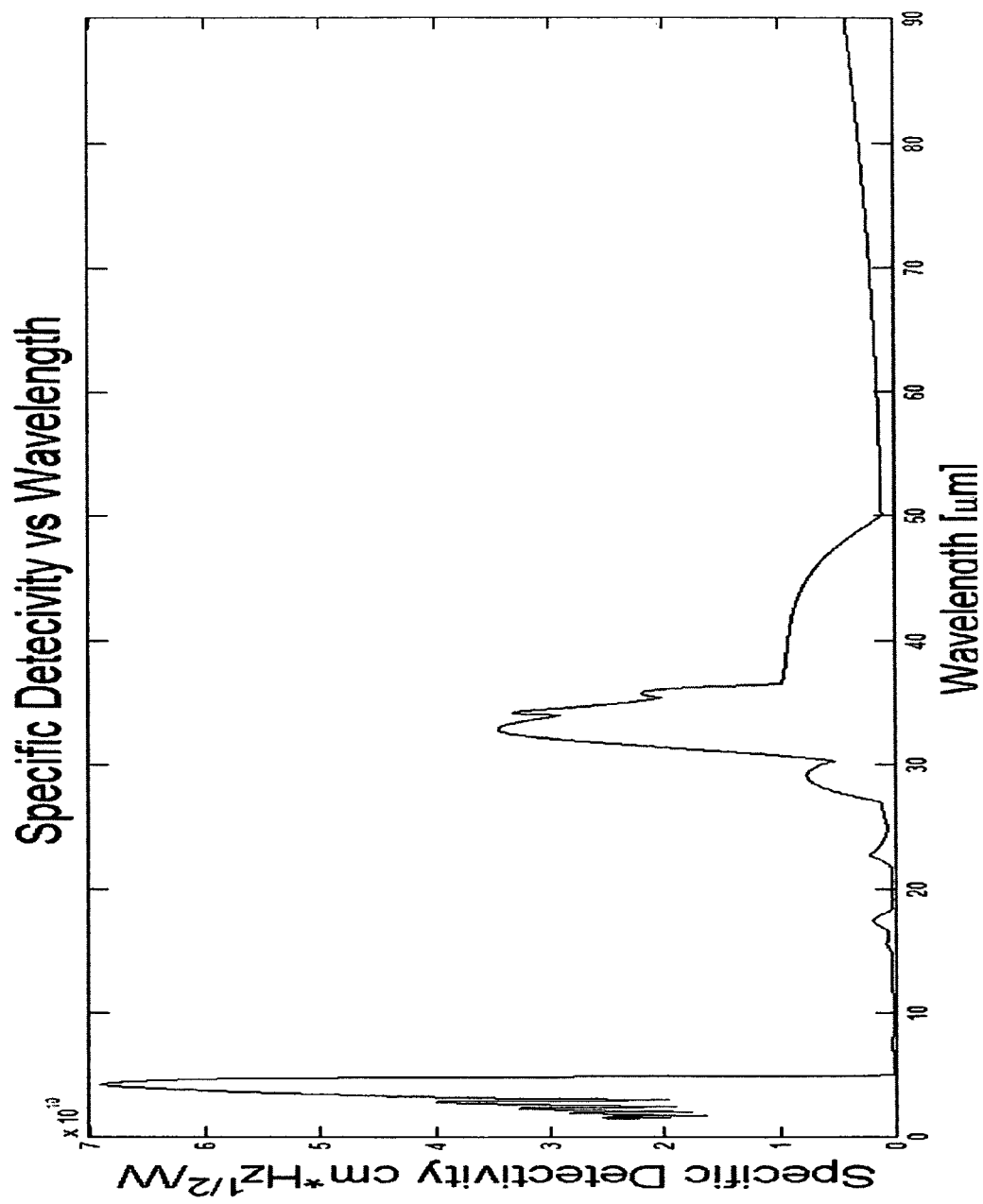
FIG. 6c is a plot of Detectivity versus wavelength at T=290K for the exemplary structure of Table 2 considering substantially all noise sources.
Figure 7A:
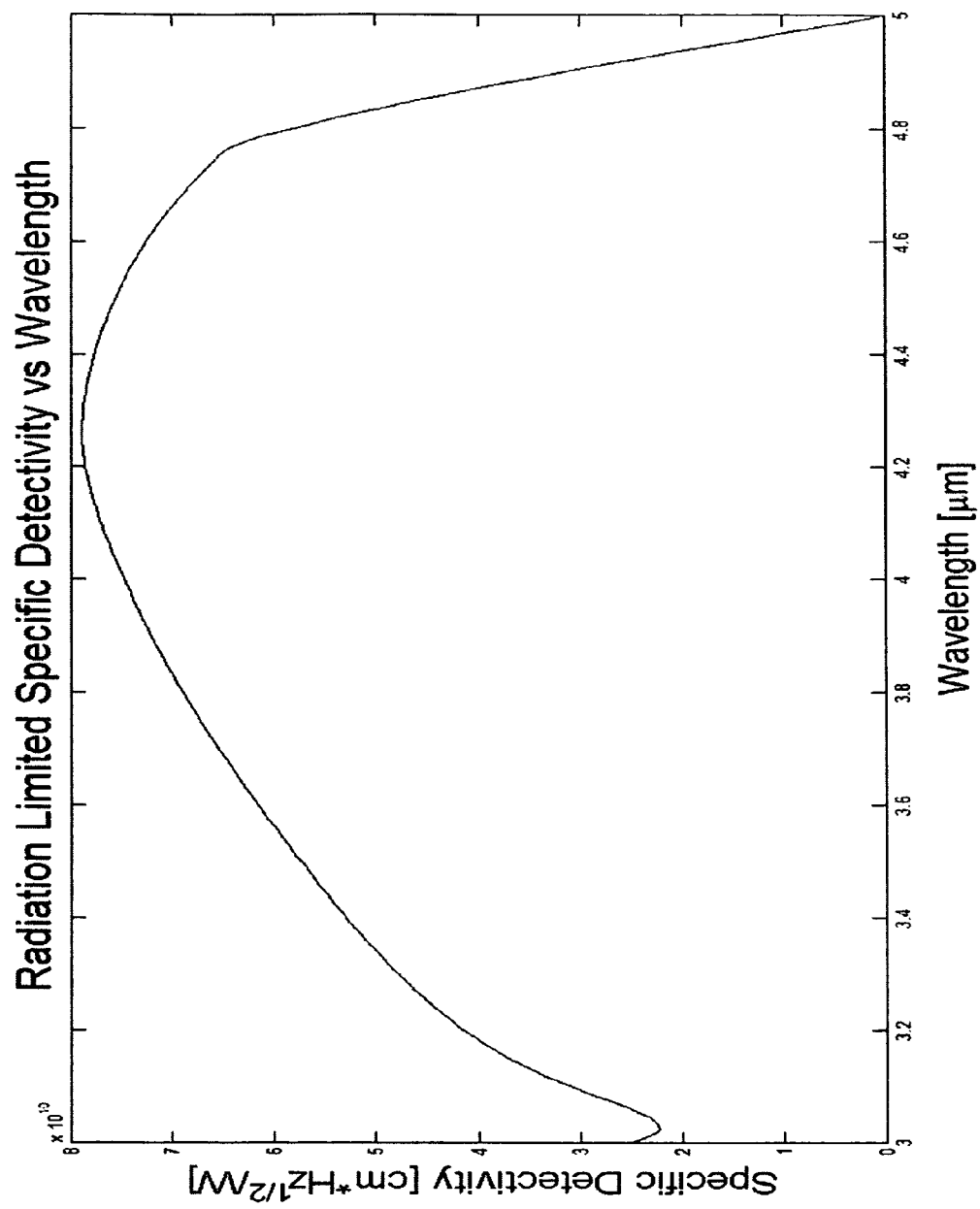
FIG. 7a is another plot of Detectivity versus wavelength at T=290K for the exemplary structures of Tables 1 and 2 with only radiation noise considered.
Figure 7B:
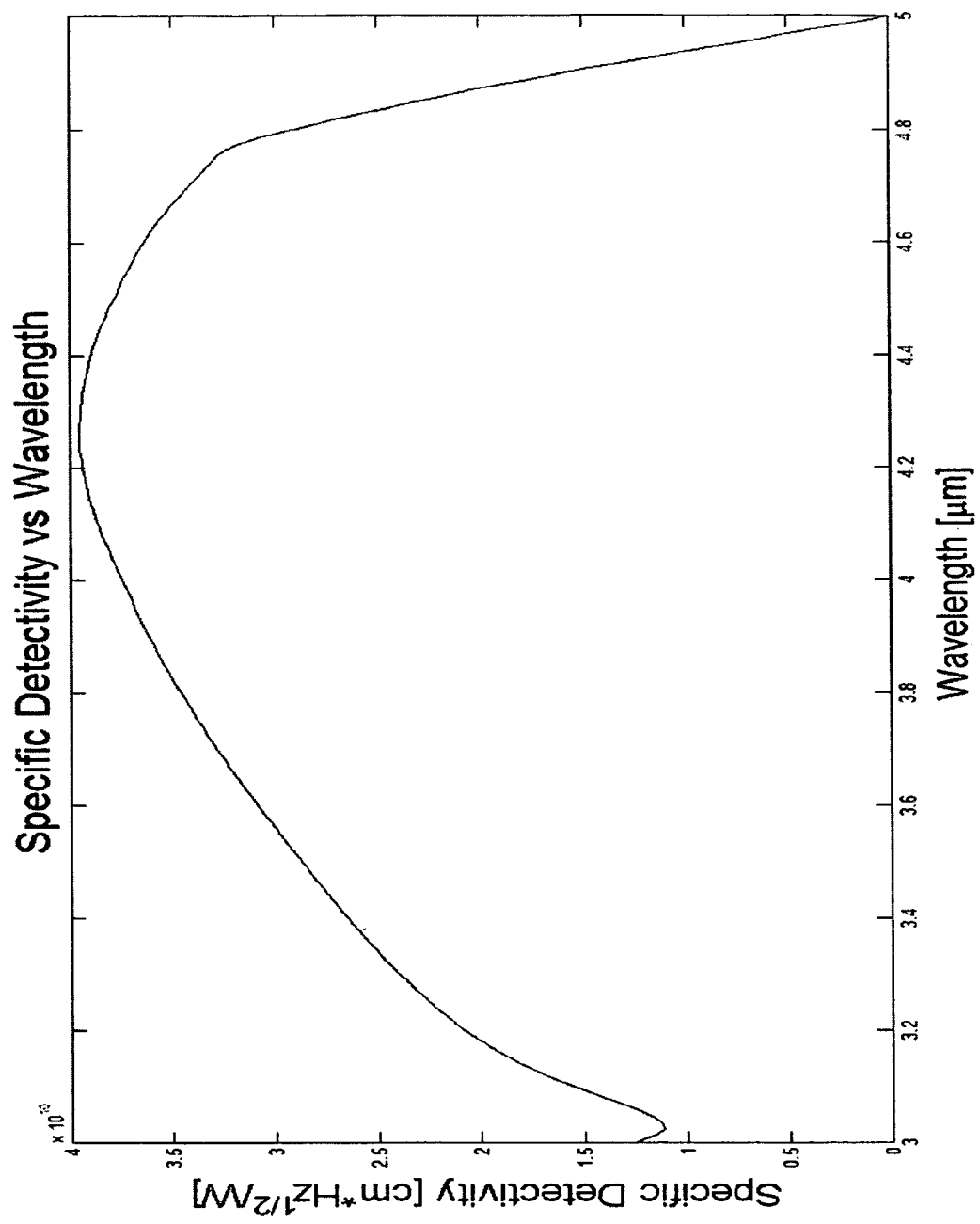
FIG. 7b is a plot of Detectivity versus wavelength at T=290K for the exemplary structure of Table 1 considering substantially all noise sources.
Figure 7C:
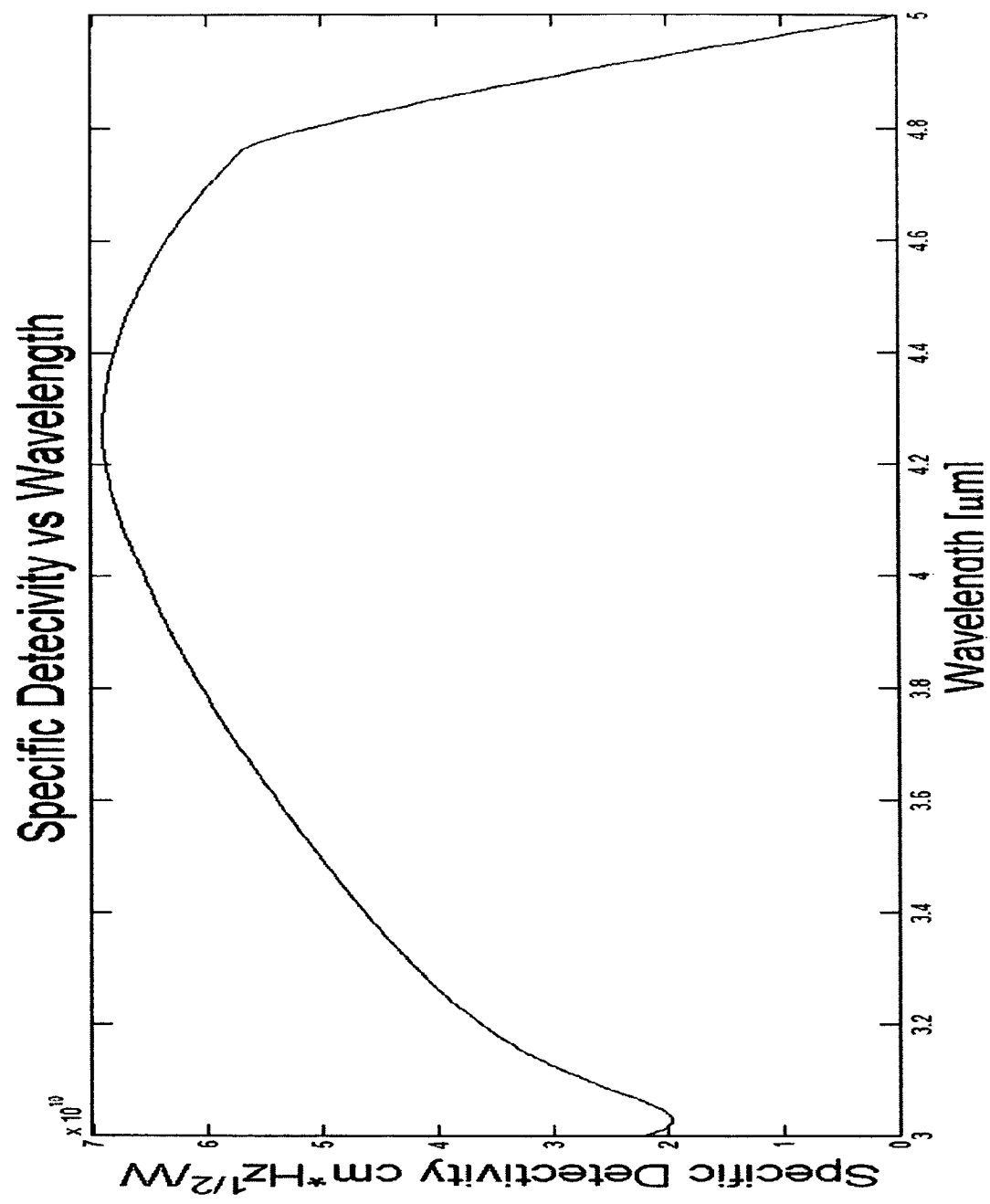
FIG. 7c is a plot of Detectivity versus wavelength at T=290K for the exemplary structure of Table 2 considering substantially all noise sources.

FIGS. 4 and 5 show the fractional absorption of the exemplary detector structure versus wavelength. The wavelength axis of FIG. 4 shows the MWIR, LWIR, and some of the near-THz ranges, while the wavelength axis of FIG. 5 illustrates the MWIR. The optical constants used in the layer simulations were taken from Palik [13]. Detectivity calculations are shown in FIGS. 6 and 7. Note that the traditional blackbody radiation limit at 290K is approximately one-third the peak detectivity value simulated for this exemplary detector.

Analysis of the four microbolometer noise sources was performed on the exemplary device described in Table 1. For this analysis some reasonable assumptions were made. The TCR of PbSe was assumed to be $0.0345 K^{-1}$ [See U.S. Pat. No. 7,262,413], the resistance of the PbSe plate was assumed to be 50 kΩ, the bias voltage was assumed to be 0.1V, and the device was assumed to be operating at 30.3 Hz corresponding to the thermal time constant, sampling one half frame per frame. Due to the lack of data available for the 1/f noise parameter for PbSe, the value for $VO_x$ of $10^{-3}$ was used. [1] With these assumptions, the Johnson noise, thermal conductance noise, 1/f noise, and radiation noise NEP were calculated at 2.49e-13 W, 4.18e-13 W, 4.22e-14, and 2.87e-13 respectively. The results of this analysis can be seen in FIGS. 6a and 7a. With all noise sources considered, peak Detectivity of nearly three times the blackbody radiation limit is shown, with the average over the 3-5 μm range double the blackbody limit.

Noise analysis of the device in Table 2 was done to demonstrate the possibly increased performance when not attempting to design devices operating at frame rate. This analysis uses the same assumptions as previously mentioned, but is operated at 4.45 Hz which corresponds to its thermal time constant. NEP values for Johnson, thermal conductance, 1/f, and radiation noise were calculated to be 1.38e-13, 1.17e-13, 6.07e-14, and 3.44e-13 respectively. A plot of the specific detectivity calculated for these devices can be seen in FIGS. 6c and 7c. Note that this device is optically identical to the device defined in Table 1, as only the support structure and plate size have changed.

The temperature sensitive material of sensor structures described herein may also comprise a device integrated with the detector device such as a silicon p-n junction diode. Because the reverse bias current of the diode is temperature sensitive, it effectively has a TCR much like a semiconductor resistor.

Thermal detectors and related methods are also described in U.S. patent application Ser. No. 11/999,739, to Talghader et al., filed on Dec. 6, 2007, the entire disclosure of which is incorporated by reference herein for all purposes. In particular, the low emissivity sensor structures disclose therein may be used as sensor structures for the presently disclosed thermal detectors.

The entire disclosure of any patent or patent application identified herein is hereby incorporated by reference for all purposes.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

REFERENCES

The following references are each incorporated by reference herein for their entire disclosure and for all purposes.

1. R. A. Wood, "Monolithic silicon microbolometer arrays," in *Semiconductor and Semimetals*, Eds. P. W. Kruse and D. D. Skatrud, vol. 47, pp. 43-121.
2. P. W. Kruse, L. D. McGlauchlin, and R. B. McQuistan, *Elements of Infrared Technology*, Wiley, New York, 1962.
3. S. W. Han, J. W. Kim, Y. S. Sohn, and D. P. Neikirk, *Electronics Letters*, vol. 40, no 22, 20046547, 2004.
4. V. N. Leonov and D. P. Butler, *Applied Optics*, vol. 40, no. 16, pp. 2601-2610, 2001.
5. M. Almasri, B. Xu, and J. Castracane, *Sensors Journal*, vol. 6, no. 2, pp. 293-300, 2006.
6. J. Geneczko, et. al., US Patent Application 2007/0176104 A1.
7. Y. Wang, B. Potter, M. Sutton, R. Supino and J. Talghader, *Transducers* 2005, pp. 1006-1009.
8. Y. Wang, B. J. Potter, and J. J. Talghader, *Optics Letters*, vol. 31, no. 13, pp. 1945-1947, Jul. 1, 2006.
9. J. J. Talghader, Y. Wang, and M. Sutton, "Tunable Finesse Infrared Cavity Thermal Detectors," U.S. patent application Ser. No. 11/805,240 filed May 22, 2007.
10. J. J. Talghader, "Detection beyond the standard radiation noise limit using reduced emissivity and optical cavity coupling," U.S. patent application Ser. No. 11/999,739 filed Dec. 6, 2007.
11. Y. C. Tai, US Patent Application Publication 2007/0017177.
12. Koskinen, U.S. Pat. No. 5,589,689.
13. E. Palik, *Handbook of optical constants*. Academic Press, 1998.

What is claimed is:

1. A thermal detector for sensing infrared radiation comprising an infrared absorber that is spectrally selective, the absorber suspended by one or more electrically conductive support structures so incoming radiation impinges on at least a portion of the infrared absorber and wherein said portion of the infrared absorber absorbs strongly in a desired spectral wavelength region and weakly in a second spectral wavelength region that corresponds with the primary thermal emission region for that temperature.

2. The thermal detector of claim 1, wherein the desired wavelength region comprises one or more of the SWIR, MWIR and THz and the primary thermal emission region comprises the LWIR.

3. The thermal detector of claim 1, wherein the infrared sensor comprises one or more of a bolometer and a thermoelectric sensor.

4. The thermal detector of claim 3, wherein the bolometer comprises a thin-film temperature sensitive resistor electrically connected to the one or more electrically conductive support structures.

5. The thermal detector of claim 4, wherein the thin-film temperature sensitive resistor comprises one or more of vanadium oxide, YBaCuO, thin-film silicon, titanium, zinc sulfide, germanium, and silicon p-n junction diode.

6. The thermal detector of claim 1, wherein the one or more electrically conducting support structures thermally isolate the infrared sensor and comprises a thermal conductance per unit surface area of the sensor below about 1 W/(Km$^2$).

7. The thermal detector of claim 1, comprising one or more mirror structures.

8. The thermal detector of claim 1, wherein the thermal detector is tunable.

9. The thermal detector of claim 1, wherein the thermal detector comprises detectivity greater than $2 \times 10^{10}$ cmHz$^{1/2}$/W.

10. The thermal detector of claim 1 in combination with a narrowband filter for chemical sensing.

11. A microbolometer comprising an absorber that is spectrally selective, the absorber comprising a semiconductor absorber layer and a TCR layer, with both layers having a bandgap or absorption bands that absorbs incoming radiation in one or more of the SWIR, MWIR, and THz spectral regions more strongly than the semiconductor absorber layer absorbs incoming radiation in the LWIR spectral region.

12. The microbolometer of claim 11, wherein the semiconductor absorber layer comprises one or more of PbSe, InSb, HgCdTe, and alloys thereof.

13. The microbolometer of claim 11, wherein the TCR layer comprises one or more of VOx, Si, ZnS, ZnSe, Ge, InSb, HgCdTe, and PbSe.

14. The microbolometer of claim 11, wherein the sensor comprises a structural layer comprising ZnS.

15. A broadband thermal detector for sensing one or more of MWIR and THz radiation comprising detectivity greater than $2 \times 10^{10}$ cmHz$^{1/2}$/W.

16. A method of sensing infrared radiation comprising providing an absorber that is spectrally selective and selectively absorbing incoming radiation of a desired spectral wavelength region more strongly than radiation in a second spectral wavelength region that corresponds with the primary thermal emission region to provide a detectivity of the sensor greater than $2 \times 10^{10}$ cmHz$^{1/2}$/W.

17. The method of claim 16, wherein the desired wavelength region comprises one or more of the MWIR and THz and the primary thermal emission region comprises the LWIR.

18. The method of claim 16, comprising measuring a change in the sensor caused by the absorbed radiation.

19. The method of claim 16, wherein the step of measuring a change in the sensor includes measuring a change in the resistance of at least a portion of the sensor.

20. The method of claim 16, wherein the sensor comprises a bolometer.

21. The method of claim 16, wherein the step of measuring a change in the sensor comprises measuring a change in the thermoelectric voltage of at least a portion of the sensor.

22. The method of claim 16, wherein the sensor comprises a thermopile.

* * * * *

UNITED STATES PATENT AND TRADEMARK OFFICE
CERTIFICATE OF CORRECTION

PATENT NO. : 8,629,398 B2  
APPLICATION NO. : 12/996704  
DATED : January 14, 2014  
INVENTOR(S) : Joseph J. Talaghader et al.

Page 1 of 1

It is certified that error appears in the above-identified patent and that said Letters Patent is hereby corrected as shown below:

In the Specification

At column 1, lines 18-20:

"This invention was made with Government support under Grant No. DAAD19-03-1-3043 awarded by the Army Research Office."

should be

-- This invention was made with government support under DAAD19-03-1-0343 awarded by the Army Research Office. The government has certain rights in the invention. --

Signed and Sealed this  
Twenty-ninth Day of July, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,629,398 B2  
APPLICATION NO. : 12/996704  
DATED : January 14, 2014  
INVENTOR(S) : Joseph J. Talaghader et al.

Page 1 of 1

It is certified that error appears in the above-identified patent and that said Letters Patent is hereby corrected as shown below:

At item (73) of the title page, the Assignee Name, "The Regents of the University of Minnesota" should be -- Regents of the University of Minnesota --

In the Specification

At column 9, line 20: "$VO_x$ of $10^{-3}$" should be -- $VO_x$ of $10^{-13}$ --

Signed and Sealed this  
Ninth Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,629,398 B2  Page 1 of 1
APPLICATION NO. : 12/996704
DATED : January 14, 2014
INVENTOR(S) : Talghader et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this
Twenty-second Day of September, 2015

Michelle K. Lee
*Director of the United States Patent and Trademark Office*